United States Patent
Chopra et al.

(10) Patent No.: US 10,503,428 B2
(45) Date of Patent: Dec. 10, 2019

(54) SYSTEM AND METHOD FOR CONCURRENT MULTIPOINT BACKUP

(71) Applicant: EMC IP Holding Company LLC, Hopkinton, MA (US)

(72) Inventors: Shelesh Chopra, Bangalore (IN); Manish Sharma, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/964,103

(22) Filed: Apr. 27, 2018

(65) Prior Publication Data

US 2019/0332263 A1    Oct. 31, 2019

(51) Int. Cl.
G06F 12/00    (2006.01)
G06F 3/06    (2006.01)
G06F 9/455    (2018.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | |
|---|---|---|
| 8,554,918 B1 | 10/2013 | Douglis |
| 9,098,525 B1 | 8/2015 | Mandic et al. |
| 9,330,109 B2 | 5/2016 | Bone et al. |
| 9,451,013 B1 * | 9/2016 | Roth ................... H04L 67/1097 |
| 9,531,809 B1 | 12/2016 | Brooker |
| 9,740,435 B2 | 8/2017 | Dolce et al. |
| 9,953,075 B1 | 4/2018 | Reiner et al. |
| 9,977,704 B1 | 5/2018 | Chopra et al. |
| 10,089,148 B1 | 10/2018 | Blitzer et al. |
| 10,180,912 B1 | 1/2019 | Franklin et al. |
| 2005/0033756 A1 | 2/2005 | Kottomtharayil et al. |

(Continued)

OTHER PUBLICATIONS

European Extended Search Report issued in corresponding EP Application No. 19150826.6, dated Apr. 5, 2019.

*Primary Examiner* — Daniel D Tsui
(74) *Attorney, Agent, or Firm* — Chamberlain, Hrdlicka, White, Williams & Aughtry

(57) ABSTRACT

A remote backup agent that provides support services includes a persistent storage storing a bad host map and a processor that obtains a first support request for a virtual machine of the virtual machines; obtains a capacity analysis of the backup storages in response to the request; makes a first determination, using the capacity analysis, that the backup storages do not have sufficient capacity to service the support request; in response to the first determination: predicts a future capacity of the backup storages and makes a second determination, using the predicted future capacity, that the backup storages have sufficient capacity to service the support request at a future point in time; in response to the second determination: initiates a support session between the remote backup agent and the virtual machine using the bad host map at the future point in time to service the first support request.

20 Claims, 12 Drawing Sheets

(56) References Cited

U.S. PATENT DOCUMENTS

| | | |
|---|---|---|
| 2006/0224852 A1* | 10/2006 | Kottomtharayil ..... G06F 3/0605 |
| | | 711/170 |
| 2009/0260021 A1 | 10/2009 | Haenel |
| 2011/0137870 A1 | 6/2011 | Feder et al. |
| 2011/0314069 A1 | 12/2011 | Alatorre et al. |
| 2012/0059934 A1 | 3/2012 | Ratiq et al. |
| 2013/0138649 A1 | 5/2013 | Broberg |
| 2014/0082167 A1 | 3/2014 | Robinson |
| 2014/0281301 A1 | 9/2014 | Reinoso et al. |
| 2014/0297950 A1 | 10/2014 | Kuwayama |
| 2014/0380014 A1 | 12/2014 | Moyer |
| 2015/0154418 A1 | 6/2015 | Redberg |
| 2015/0205528 A1 | 7/2015 | Hyde, II et al. |
| 2015/0261468 A1 | 9/2015 | Khoyi et al. |
| 2016/0054922 A1 | 2/2016 | Awasthi et al. |
| 2016/0062795 A1 | 3/2016 | Hu et al. |
| 2017/0060695 A1* | 3/2017 | Clare ..................... G06F 16/27 |
| 2017/0093976 A1 | 3/2017 | Raghunath et al. |
| 2017/0168729 A1 | 6/2017 | Faulkner et al. |
| 2017/0351426 A1 | 12/2017 | Anderson et al. |
| 2018/0267830 A1 | 9/2018 | Rivera et al. |
| 2018/0314429 A1 | 11/2018 | Thomas |

* cited by examiner

US 10,503,428 B2

SYSTEM AND METHOD FOR CONCURRENT MULTIPOINT BACKUP

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a remote backup agent that provides support services to virtual machines using backup storages in accordance with one or more embodiments of the invention includes a persistent storage and a processor. The persistent storage stores a bad host map. The processor obtains a first support request for a virtual machine of the virtual machines; obtains a capacity analysis of the backup storages in response to the request; makes a first determination, using the capacity analysis, that the backup storages do not have sufficient capacity to service the support request. In response to the first determination the processor predicts a future capacity of the backup storages and makes a second determination, using the predicted future capacity, that the backup storages have sufficient capacity to service the support request at a future point in time. In response to the second determination the processor initiates a support session between the remote backup agent and the virtual machine using the bad host map at the future point in time to service the first support request.

In one aspect, a method of providing support services to virtual machines in accordance with one or more embodiments of the invention includes obtaining a first support request for a virtual machine of the virtual machines; obtaining a capacity analysis of the backup storages in response to the request; making a first determination, using the capacity analysis, that the backup storages do not have sufficient capacity to service the support request. The method further includes in response to the first determination: predicting a future capacity of the backup storages and making a second determination, using the predicted future capacity, that the backup storages have sufficient capacity to service the support request at a future point in time. The method further includes in response to the second determination: initiating a support session between the remote backup agent and the virtual machine using the bad host map at the future point in time to service the first support request.

In one aspect, a non-transitory computer readable medium in accordance with one or more embodiments of the invention includes computer readable program code, which when executed by a computer processor enables the computer processor to perform a method for providing support services to virtual machines, the method includes obtaining a first support request for a virtual machine of the virtual machines; obtaining a capacity analysis of the backup storages in response to the request; making a first determination, using the capacity analysis, that the backup storages do not have sufficient capacity to service the support request. The method further includes in response to the first determination: predicting a future capacity of the backup storages and making a second determination, using the predicted future capacity, that the backup storages have sufficient capacity to service the support request at a future point in time. The method further includes in response to the second determination: initiating a support session between the remote backup agent and the virtual machine using the bad host map at the future point in time to service the first support request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing services to virtual machines. More specifically, the systems, devices, and methods may limit the maximum number of concurrently performed sessions performed by a system. Doing so may improve the likelihood that each concurrently performed session is provided with sufficient computing resources for the respective session to be completed.

In one or more embodiments of the invention, the system may take action to schedule a backup or restoration at a future period of time in which sufficient computing resources to complete the backup or restoration are predicted. The prediction may be based on backup/restoration policies that govern backup and restoration workflows. The sufficiency of the computing resources may further taken into account the computing resources of component of the system including remote backup agents that orchestrate the generation of backups or the performance of restorations in addition to backup storages that store or provide data for backups or restorations.

In this manner, one or more embodiments of the invention may address the problem of scheduling of actions to be performed in a distributed system. As will be discussed in greater detail below, embodiments may address multiple, additional problems beyond that of scheduling in a distributed system.

Figure 1:
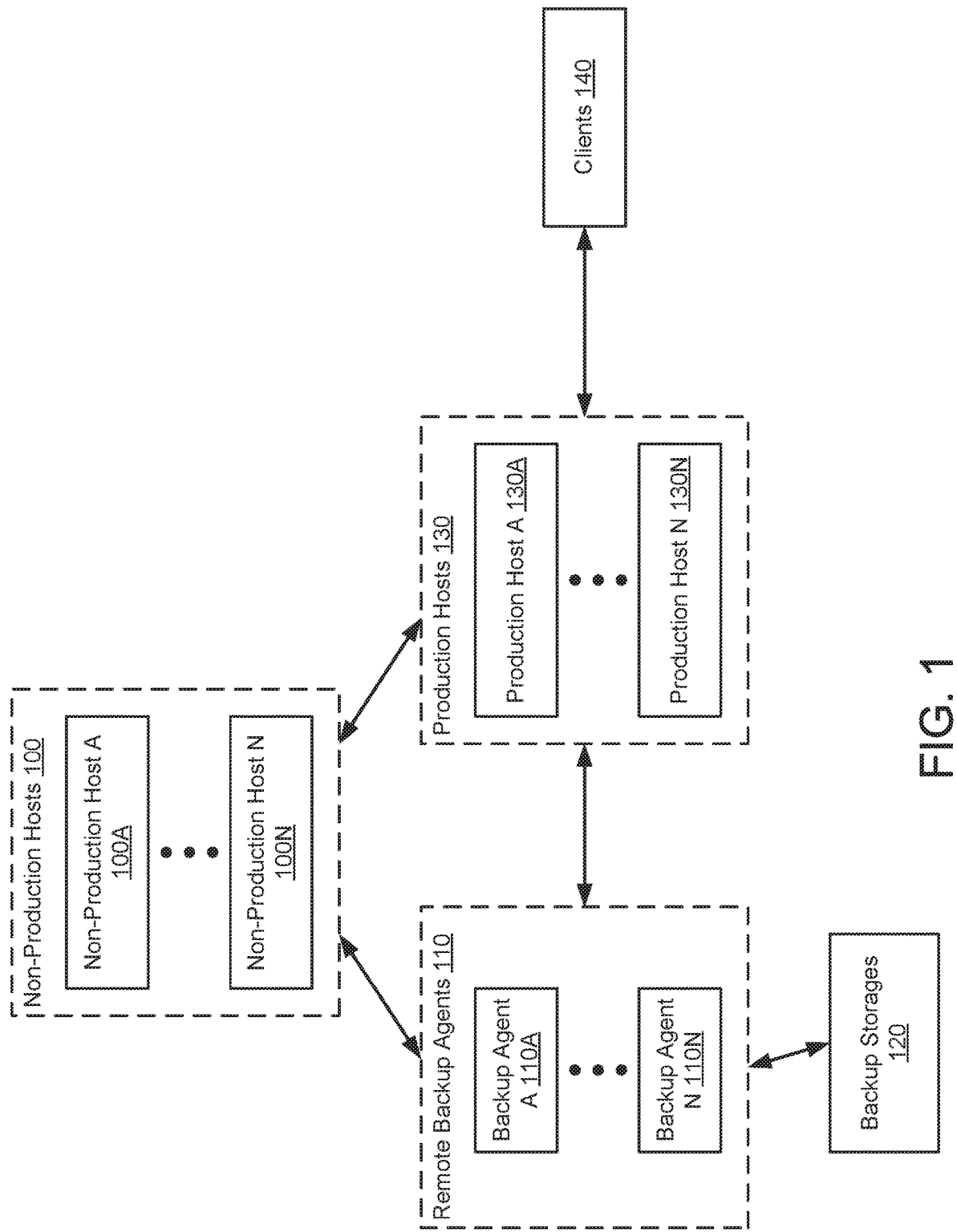
FIG. 1 shows a diagram of a system in accordance with one or more embodiments of the invention.

FIG. 1 shows an example system in accordance with one or more embodiments of the invention. The system may include production hosts (130) that host virtual machines exposed to clients (140). The system may further include remote backup agents (110) that provide services to the production hosts. The services may include data storage in backup storages (120), restorations of virtual machines using non-production hosts (100). Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention. For additional details regarding computing devices, See FIG. 9.

The clients (100) may interact with virtual machines hosted by the production hosts (130). For example, the virtual machines may host databases, email servers, or any other type of application. The clients (100) may utilizes services provided by these or other applications. In another example, the clients (100) may directly operate the virtual machines, e.g., a virtualized environment. In such a scenario, the clients (100) may operate as terminals for accessing the virtual machines.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 9.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines. For additional details regarding the production hosts (130), See FIG. 2.

In one or more embodiments of the invention, the non-production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 9.

In one or more embodiments of the invention, the non-production hosts (130) are distributed computing devices. As used herein, a distributed computing device refers to functionality provided by a logical device that utilizes the computing resources of one or more separate and/or distinct computing devices. For example, in one or more embodiments of the invention, the non-production hosts (130) may be distributed devices that include components distributed across a number of separate and/or distinct computing devices. In such a scenario, the functionality of the non-production hosts (130) may be performed by multiple different computing devices without departing from the invention.

In one or more embodiments of the invention, the non-production hosts (130) host concealed virtual machines. A concealed virtual machine may not be visible to other devices. The non-production hosts (130) may host any number of concealed virtual machines without departing from the invention. The non-production hosts (130) may also host agents, or other executing components, for orchestrating the operation of the hosted virtual machines.

In one or more embodiments of the invention, the remote backup agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. remote backup agents (110) may be other types of computing devices without departing from the invention. For additional details regarding computing devices, See FIG. 9.

In one or more embodiments of the invention, the remote backup agents (110) are distributed computing devices. As used herein, a distributed computing device refers to functionality provided by a logical device that utilizes the computing resources of one or more separate and/or distinct computing devices. For example, in one or more embodiments of the invention, the remote backup agents (110) may be distributed devices that include components distributed across a number of separate and/or distinct computing devices. In such a scenario, the functionality of the remote backup agents (110) may be performed by multiple different computing devices without departing from the invention.

In one or more embodiments of the invention, the remote backup agents (110) provide services to virtual machines. The services may include storing virtual machine data, generating backups of the virtual machines, and performing restorations of virtual machines. To provide the aforementioned services, the remote backup agents (110) may perform the methods illustrated in FIGS. 6-8B. The remote backup agents (110) may use data structures shown in FIGS. 5A-5C when performing the aforementioned methods. For additional details regarding the remote backup agents (110), See FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The backup storages (120) may be other types of computing devices without departing from the invention. For additional details regarding computing devices, See FIG. 9.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, images of virtual machines executing on the production hosts (130), application data from virtual machines, or any other type of data. The data stored in the backup storages (120) may enable virtual machines executing on the production hosts (130) to be restored. In other words, the data stored in the backup storages (120) may reflect a past state of the virtual machines or other applications executing on the production hosts (130). The backup storages (120) may store additional or different data without departing from the invention.

In one or more embodiments of the invention, different backup storages (120) have difference performance characteristics. For example, some backup storages may be high performance in that data may be stored to or retrieved from the backup storages quickly. In contrast, some backup storages may be low performance in that data may be stored to or retrieved from the backup slowly. It may be less costly to store data in low performance backup storages rather than high performance storages.

In one or more embodiments of the invention, multiple backup storages are used to store multiple copies of the same data. For example, in some embodiments of the invention a high degree redundancy may be requested. In such a scenario, multiple copies of data may be stored in multiple backup storages to improve the likelihood of ensuring that the stored data is retrievable in the future.

In one or more embodiments of the invention, some of the backup storages (120) are deduplicated storages. A deduplicated storage attempts to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage.

Figure 2:
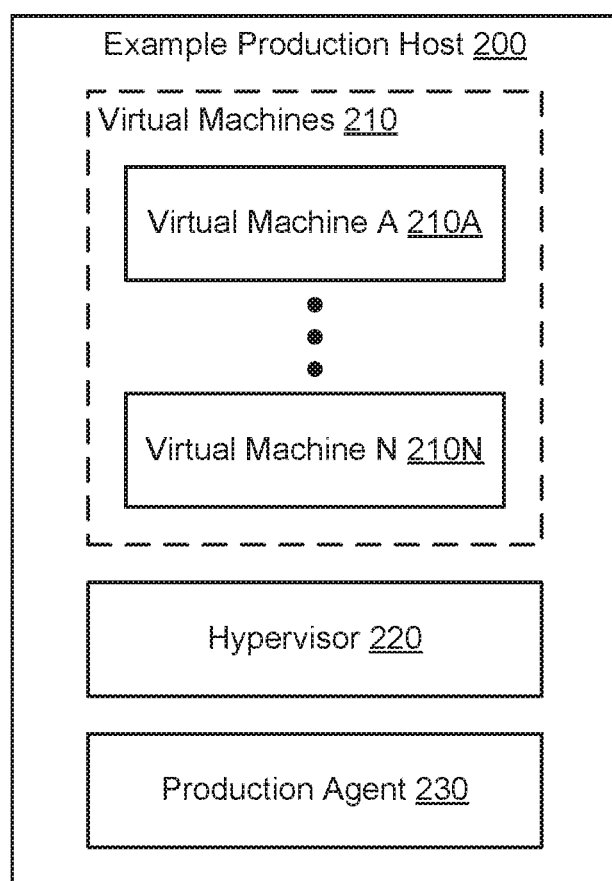
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production hosts (200) host virtual machines (210). The example production hosts (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, an image of each of the virtual machines (210) at points in time in the past may be stored. Following the points in time in the past, a differencing disk that stores each of the changes made from the image of each of the virtual machines (210) may be stored. The aforementioned images and differencing disks may be stored locally or in a backup storage. In one or more embodiments of the invention, generating a backup of a virtual machine includes storing a copy of the image of the virtual machine and any differencing disks in a backup storage. Thus, when performing a restoration of a virtual machine, the differencing disks may be merged with a virtual machine image to obtain a representation of the virtual machine at the point in time following the periods of time reflected by each of the differencing disks.

The example production host (200) may include a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be hardware processor including circuitry such as, for example, a central processing unit or a microcontroller. The processor may be other types of hardware devices for processing digital information without departing from the invention.

The example production host (200) may include a production agent (230) that manages the storage of virtual machine data in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate a processes of restoring a virtual machine, application, or other entity or migrating a restored virtual machine, application, or other entity.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

Figure 3:
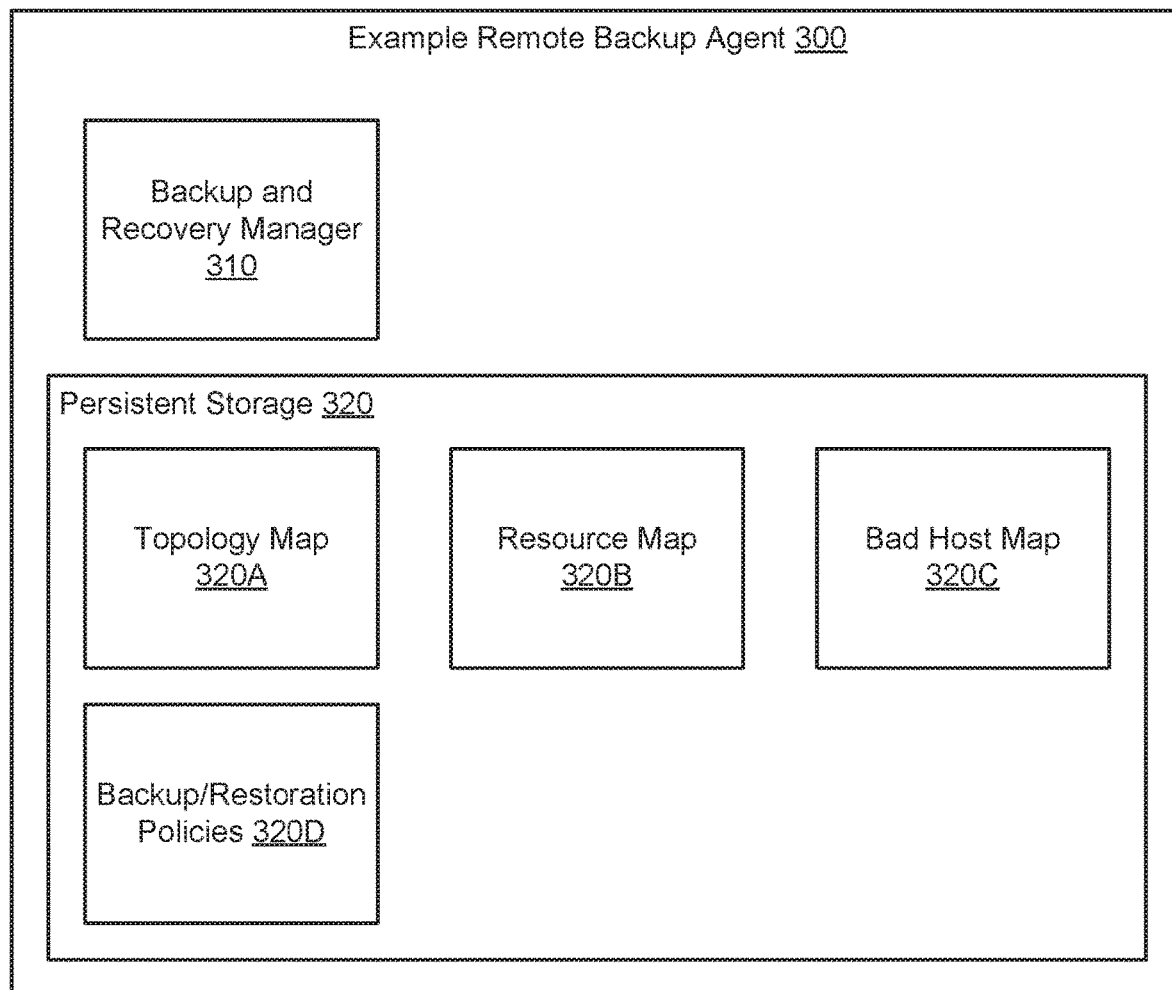
FIG. 3 shows a diagram of an example backup agent in accordance with one or more embodiments of the invention.

Data from the production hosts may be stored by a remote backup agent. FIG. 3 shows a diagram of an example remote backup agent (300) in accordance with one or more embodiments of the invention.

In one or more embodiments of the invention, the example remote backup agent (300) manages the process of storing data in backup storages and restoring virtual machines, applications, or other entities using data stored in the backup storages. To provide the aforementioned functionality, the example remote backup agent (300) may include a backup and recovery manager (310) and a persistent storage (320) storing data structures used by the backup and recovery manager (310).

In one or more embodiments of the invention, the backup and recovery manager (310) provides backup and restoration services to virtual machines. To provide backup services, the backup and recovery manager (310) may obtain data from the virtual machines and store it in the backup storages. To provide recovery services, the backup and recovery manager (310) may obtain data from a backup storage and perform a restoration of a virtual machine, application, or another entity. In one or more embodiments of the invention, performing a restoration returns an entity to a previous state. To provide the aforementioned functionality, the backup and recovery manager (310) may perform all, or a portion thereof, of the methods illustrated in FIGS. 6-8B. The backup and recovery manager (310) may use the data structures in the persistent storage (320).

In one or more embodiments of the invention, the backup and recovery manager (310) is a hardware device including circuitry. The backup and recovery manager (310) may be, for example, a digital signal processor, a field programmable gate array, or an application specific integrated circuit. The backup and recovery manager (310) may be other types of hardware devices without departing from the invention.

In one or more embodiments of the invention, the backup and recovery manager (310) is implemented as computing code stored on a persistent storage that when executed by a processor performs the functionality of the backup and recovery manager (310). The processor may be hardware processor including circuitry such as, for example, a central processing unit or a microcontroller. The processor may be other types of hardware devices for processing digital information without departing from the invention.

In one or more embodiments of the invention, the persistent storage (320) is storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality.

In one or more embodiments of the invention, the persistent storage (320) stores a topology map (320A), a resource map (320B), a bad host map (320C), and backup/restoration policies (320D). The persistent storage (320) may store additional data structures without departing from the invention.

The topology map (320A) may be a representation of the physical and virtual topology of the entities of FIG. 1. For example, the topology map may include the hardware and/or software profile of each computing device and/or the connective of each computing device. The topology map (320A) may be updated by the example remote backup agent (300).

The resource map (320B) may specify the computing resources of the production hosts, the non-production hosts, the remote backup agents, and the backup storages of the system of FIG. 1. For example, the resource map (320B) may specify the available processing resources, memory resources, storage resources, and communication resources of each of the aforementioned entities. The resource map (320B) may be updated by the example remote backup agent (300).

The bad host map (320C) may specify the production hosts that are in a partial error state. For example, over time components of the production hosts may fail. The component may be either hardware or software, e.g., a hypervisor, a backup agent, etc. The bad host map (320C) may specify identifiers of each production host that is in a partial error state due to a partial failure of hardware or software component of the respective production host. The bad host map (320C) may be updated by the example remote backup agent (300). For example, the example remote backup agent (300) may update the bad host map (320C) when the backup and recovery manager (310) is unable to perform a backup or a recovery due to a partial error state of a production host.

The backup/restoration policies (320D) may specify the backup and/or restoration workflows for virtual machines hosted by components of the system of FIG. 1. The backup/restoration policies (320D) may specify the frequency, storage location, restoration location, and other aspects of performing backups or restorations. The backup/restoration policies (320D) may be specified on a granular level, e.g., a workflow for each virtual machine, or on a macro level, e.g., a workflow for multiple virtual machines.

While the data structures of the persistent storage (320) are illustrated as separate data structures, the aforementioned data structures may be combined with each other and/or other data without departing from the invention. Additionally, while the aforementioned data structures are illustrated as being stored on the example remote backup agent (300), the data structures may be stored on persistent storage of other devices without departing from the invention. For example, multiple remote backup agents may use a single instance of any of the aforementioned data structures stored on one of the remote backup agents or another entity.

Figure 4:
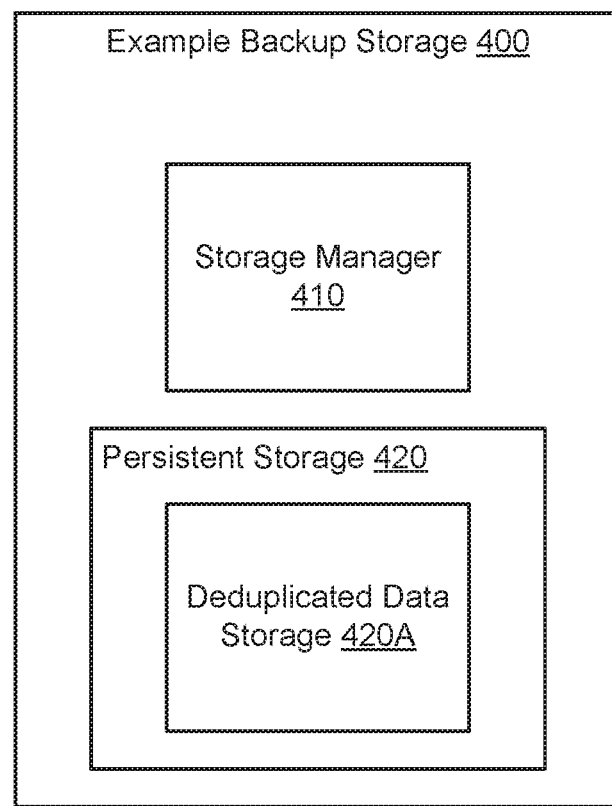
FIG. 4 shows a diagram of an example backup storage in accordance with one or more embodiments of the invention.

When generating a backup or performing a restoration of a virtual machine, a remote backup agent may store or access data in a backup storage. FIG. 4 shows a diagram of an example backup storage (400) in accordance with one or more embodiments of the invention.

In one or more embodiments of the invention, the example backup storage (400) stores data from remote backup agents or other entities. For example, a remote backup agent may send data to the example backup storage (400) for storage. In some cases, an example backup storage (400) may store data obtained from a production host. In such a scenario, the remote backup agent may orchestrate the process, i.e., instructs the production host to store the data in the example backup storage (400).

In one or more embodiments of the invention, the example backup storage (400) provides previously stored data to remote backup agents or other entities. For example, a remote backup agent may initiate a restoration of a virtual machine. The remote backup agent may send an instruction to the example backup storage (400) or the computing device where the restoration of the virtual machines will be performed to provide or obtain, respectively, data in the example backup storage (400). The obtained data may be used to perform the restoration.

To provide the aforementioned functionality, the example backup storage (400) may include a storage manager (410) and a persistent storage (420) storing data structures used by the storage manager (410).

In one or more embodiments of the invention, the storage manager (410) manages the storage of data in and the retrieval of data from the persistent storage (420). In one or more embodiments of the invention, the data stored in the persistent storage (420) may be deduplicated before storage.

In such a scenario, the storage manager (410) may compare to-be-stored data to already stored data and only store unique portions of the to-be-stored data. A unique portion may be a portion of the to-be-stored data that is not duplicative of data already stored in the persistent storage (420). For example, after storing a first draft of a text document in the persistent storage (420), minor changes may be made to the first draft. When the first draft is then stored again in the persistent storage (420), the storage manager (410) may only store the portions of the first draft that were changed. Thereby, more data may be stored in the persistent storage (420) when compared to storing data in the persistent storage (420) without performing deduplication of the data. However, deduplication uses significant computing resource including processing cycles, memory cycles, and/or storage input-output.

In one or more embodiments of the invention, the storage manager (410) is a hardware device including circuitry. The storage manager (410) may be, for example, a digital signal processor, a field programmable gate array, or an application specific integrated circuit. The storage manager (410) may be other types of hardware devices without departing from the invention.

In one or more embodiments of the invention, the storage manager (410) is implemented as computing code stored on a persistent storage that when executed by a processor performs the functionality of the storage manager (410). The processor may be hardware processor including circuitry such as, for example, a central processing unit or a microcontroller. The processor may be other types of hardware devices for processing digital information without departing from the invention.

In one or more embodiments of the invention, the persistent storage (420) is storage device that stores data structures. The persistent storage (420) may be a physical or virtual device. For example, the persistent storage (420) may include solid state drives, solid state drives, tape drives, and other components to provide data storage functionality. Alternatively, the persistent storage (420) may be a virtual device that utilizes the physical computing resources of other components to provide data storage functionality.

In one or more embodiments of the invention, the persistent storage (420) stores a deduplicated data storage (420A). The deduplicated data storage (420A) may be a data structure that includes data necessary to regenerate previously stored data structures. To regenerate a previously stored data structure, multiple pieces of different unique data stored in the deduplicated data storage (420A) may be combined.

As discussed with respect to the storage manager (410), a deduplicated storage may only store copies of unique data. In such a scenario, each copy of a unique data may represent a portion of multiple data structures that were previously stored in the deduplicated data storage (420A). Thus, a copy of a unique piece of data stored in the deduplicated data storage (420A) may be used to regenerate multiple pieces of previously stored data.

The deduplicated data storage (420A) may store unique pieces of data in any format without departing from the invention. Additionally, while the persistent storage (420) is illustrated as only including the deduplicated data storage (420A), the persistent storage (420) may include other data without departing from the invention.

Figure 5A:
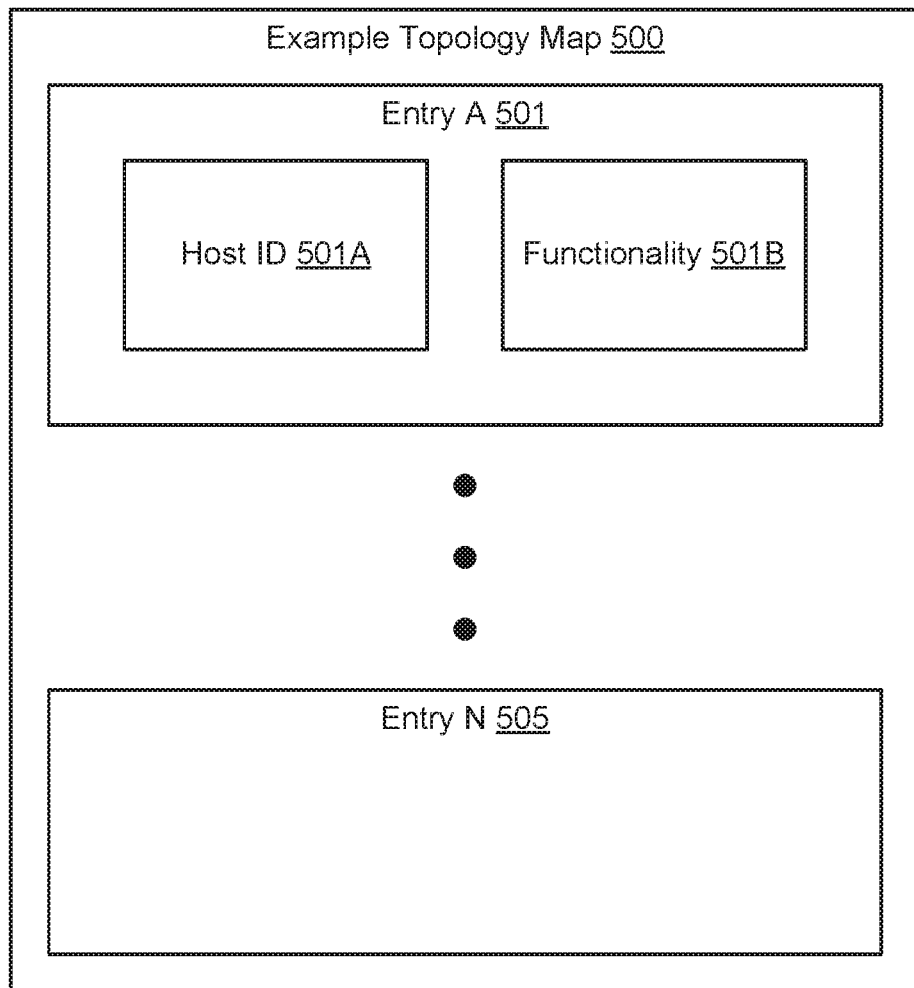
FIG. 5A shows a diagram of an example topology map in accordance with one or more embodiments of the invention.
Figure 5B:
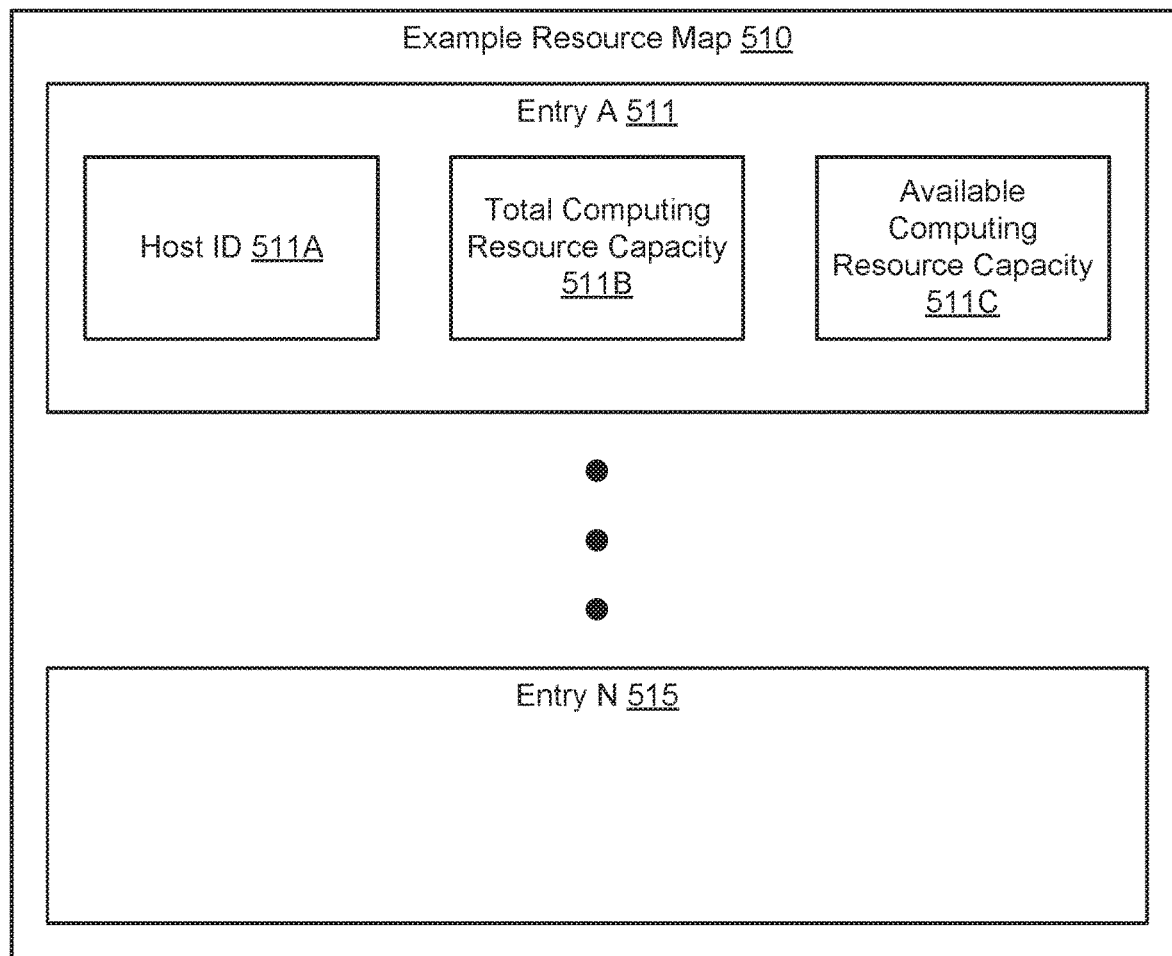
FIG. 5B shows a diagram of an example resource map in accordance with one or more embodiments of the invention.
Figure 5C:
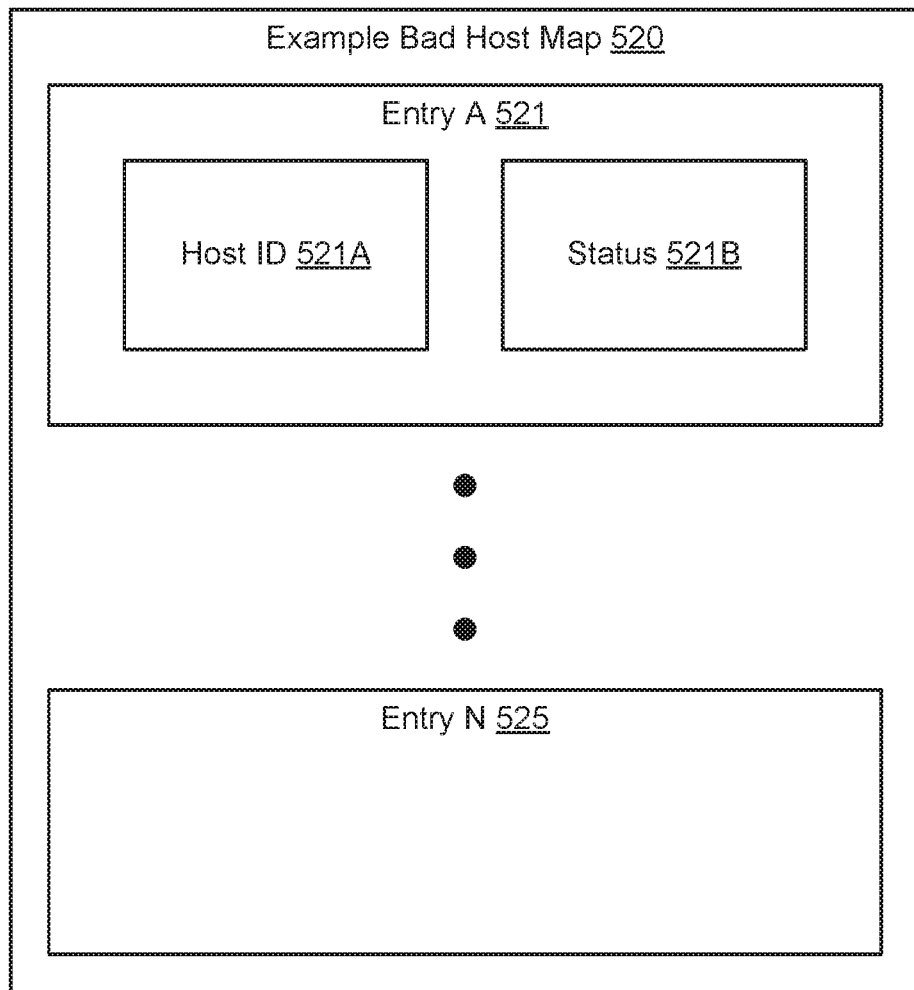
FIG. 5C shows a diagram of an example bad host map in accordance with one or more embodiments of the invention.

As discussed above, data structures used by various components of the system of FIG. 1 may be stored in persistent storages. FIGS. 5A-5C show data structures that may be used by the components of the system of FIG. 1.

FIG. 5A shows a diagram of an example topology map (500) in accordance with one or more embodiments of the invention. The example topology map (500) may specify functionality of the production hosts, the non-production hosts, the remote backup agents, and/or the backup storages. The functionality may include the computing resources such as, for example, the computing cycles, memory cycles, storage bandwidth, and/or communication bandwidth. The functionality may include a function to be performed, i.e., a function of a distributed system.

The example topology map (500) may also specify the connectivity of each of the aforementioned components. For example, the connectivity map may specify the bandwidth between each of the components.

In one or more embodiments of the invention, the example topology map (500) includes a number of entries (501, 505). Each entry may include a host identifier (e.g., 501A) that specifies an identifier of a component of FIG. 1. Each entry may also include a functionality (e.g., 501B), i.e., a description, associated with the component of the system of FIG. 1 identified by the host ID (501A).

FIG. 5B shows a diagram of an example resource map (510) in accordance with one or more embodiments of the invention. The example resource map (510) may specify the computing resources of each component, or a portion of the components, of the system of FIG. 1.

In one or more embodiments of the invention, the example resource map (510) includes a number of entries (511, 515). Each entry may include a host identifier (e.g., 511A) that specifies an identifier of a component of FIG. 1. Each entry may also include a total computing resource capacity (e.g., 511B) that specifies a total quantity of computing resources available to the component of the system of FIG. 1 identified by the host ID (511A). Each entry may also include an available computing resource capacity (e.g., 511B) that specifies the available quantity of computing resources of the component of the system of FIG. 1 identified by the host ID (511A). In other words, the available computing resource capacity (511C) may specify the computing resources that are not currently in use while the total computing resource capacity (511B) may specify the aggregate of the computing resources that are both in use and not in use.

FIG. 5C shows a diagram of an example bad host map (520) in accordance with one or more embodiments of the invention. The example bad host map (520) may specify hosts of the system of FIG. 1 that are in a state that prevents virtual machines from being restored using the hosts. For example, a host may have a hardware error or a software error that prevents the host performing a restoration of a virtual machine. In one scenario, a production agent (e.g., 230, FIG. 2) of a production host may crash and thereby prevent a remote backup agent from initiating a restoration or backup. The example bad host map (520) may specify each of the aforementioned hosts that are in such a state.

In one or more embodiments of the invention, the example bad host map (520) includes a number of entries (521, 525). Each entry may include a host identifier (e.g., 521A) that specifies an identifier of a component of FIG. 1. Each entry may also include a status (e.g., 521B) that specifies whether the host specified by the host ID (521A) is in a state that prevents it from performing backups or restorations.

While the data structure illustrated in FIGS. 5A-5C are shown as a list of entries, the data structures may be stored in other formats, may be divided into multiple data structures, and/or portion of the data structures may be distributed across multiple computing devices without departing from the invention.

As discussed above, components of the system of FIG. 1 may perform methods of generating backups and performing restorations of virtual machines, in addition to other functions. FIGS. 6-8B show methods in accordance with one or more embodiments of the invention that may be performed by components of the system of FIG. 1.

Figure 6:
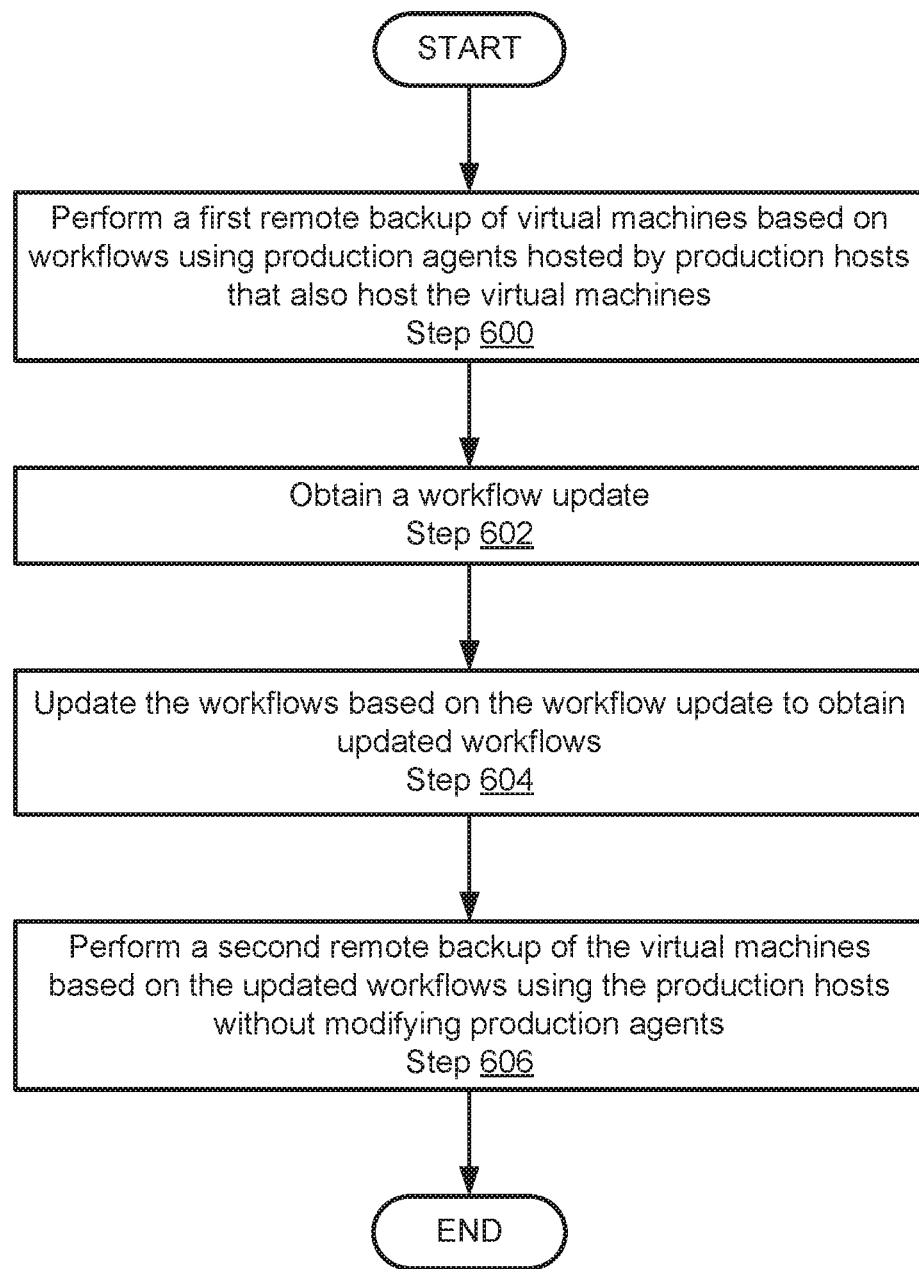
FIG. 6 shows a flowchart of a method of providing backup services to virtual machines in accordance with one or more embodiments of the invention.

FIG. 6 shows a flowchart of a method in accordance with one or more embodiments of the invention. The method depicted in FIG. 6 may be used to assign clients to storage gateway pools in accordance with one or more embodiments of the invention. The method shown in FIG. 6 may be performed by, for example, remote backup agents (110, FIG. 1). Other components of the system illustrated in FIG. 1 may perform the method of FIG. 6 without departing from the invention.

In Step 600, a first remote backup of virtual machines is performed based on workflows using production agents hosted by production hosts that also host the virtual machines.

In one or more embodiments of the invention, performing the first remote backup of the virtual machine includes initiating a backup by a remote backup agent, generating a backup package that reflects the changes to the virtual machines since the last time a backup of the virtual machines was generated, and storing the generate backup in a backup storage. The remote backup agent may initiate the backup by sending a message to a production agent present on a host that hosts a portion of the virtual machines.

The backup package may be multiple packages each of which including data from a single virtual machine. Each of the multiple packages may be transmitted separately, or in aggregate, to the backup storage. Different packages of the multiple packages may be transmitted to different backup storages. Copies of any number of the multiple packages may be transmitted to and stored in any number of backup storages.

In one or more embodiments of the invention, the first remote backup may be performed, in part, by sending a command from a remote backup agent to a production agent. The command may instruct the production agent to perform one of a number of predefined functions. The functions may be to generate a backup of a virtual machine.

In one or more embodiments of the invention, the first remote backup may be performed by identifying a portion of the virtual machines based on the workflows; identifying a first portion of the production hosts that each host a virtual machine of the portion of the virtual machines; sending a backup initiation request to each production host of the portion of the production hosts; obtaining first backup data from each production host of the first portion of the production hosts after sending the backup initiation request; and storing the first obtained backup data in backup storage. The workflows may be specified by backup/restoration policies.

In Step 602, a workflow update is obtained.

In one or more embodiments of the invention, the workflow update specifies a change to a process of performing a backup or a process of performing a restoration of a virtual machine. The workflow update may specify, for example, a change to a frequency of generation of a backup, a change to a location to where a virtual machine is to be restored, or a change to a storage location of the backup. The workflow update may specify other portions of the process of generating a backup or performing a restoration without departing from the invention.

In Step 604, workflows are updated based on the workflow update to obtain updated workflows.

In one or more embodiments of the invention, the workflows are updated by modify a backup/restoration policy (e.g., 320D) that specifies the actions taken to perform a backup or restoration of a virtual machine. The backup/restoration policy may be modified to conform to the workflow specified by the workflow update.

In one or more embodiments of the invention, multiple backup/restoration policies are updated based on the workflow update. In other words, a workflow update may be used to modify multiple backup/restoration policies. In this manner, multiple policies that determine the workflows for multiple virtual machines may be updated similarly. Thus, embodiments of the invention may ensure that workflows for any number of virtual machines may be made to be consistent, i.e., the same workflow. In contrast, prior methods of performing a workflow update may require the separate update of multiple entities across a range of both production and non-production hosts. Thus, in contrast to prior implementations, embodiments of the invention may provide consistent workflows for performing backups or restorations of virtual machines.

In Step 606, a second remote backup of the virtual machines is performed based on the updated workflows using the production hosts without modifying production agents.

In one or more embodiments of the invention, the updated workflows specify a workflow that is different from a workflow specified by the workflows before the update. The difference may be, for example, a frequency at which the update is performed, a storage location of the generated backup, a redundancy of the backup, an entity that performs the backup, or any other aspect of generating a workflow.

In one or more embodiments of the invention, after the second remote backup of the virtual machines is performed, a restoration of a virtual machine of the virtual machines is performed. The restoration may be performed using the updated workflows. The restoration may be performed based on a workflow that is different from the workflows before they were updated.

The method may end following Step 606.

Figure 7:
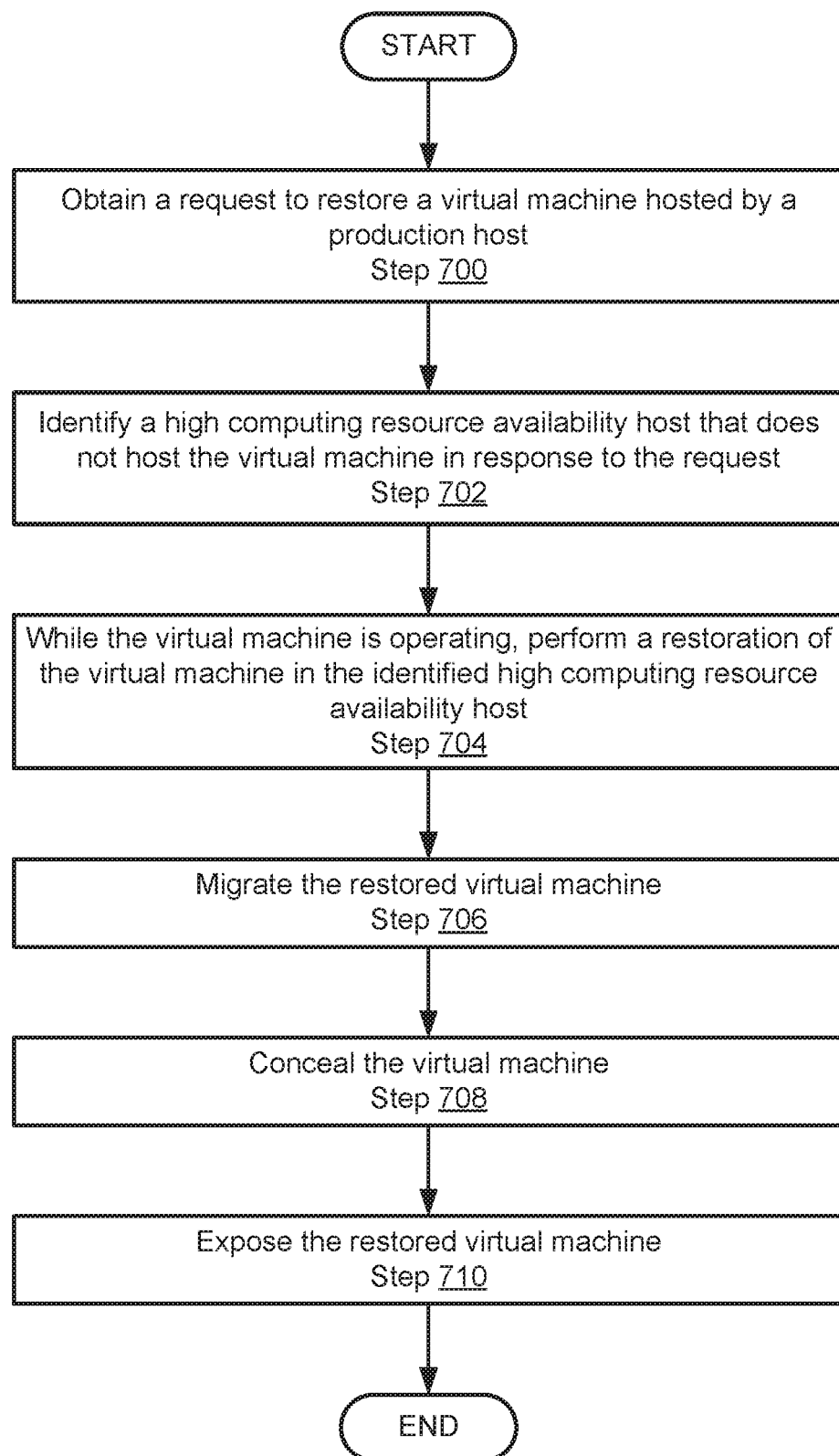
FIG. 7 shows a flowchart of a method of performing a restoration of a virtual machine in accordance with one or more embodiments of the invention.

As discussed above, remote backup agents may both perform backups and restorations. FIG. 7 shows a flowchart of a method in accordance with one or more embodiments of the invention. The method depicted in FIG. 7 may be used to perform a restoration in accordance with one or more embodiments of the invention. The method shown in FIG. 7 may be performed by, for example, remote backup agents (110, FIG. 1). Other components of the system illustrated in FIG. 1 may perform the method of FIG. 7 without departing from the invention.

In Step 700, a request to restore a virtual machine hosted by a production host is obtained.

In one or more embodiments of the invention, the request is obtained from a production host. For example, a production agent may identify that a virtual machine is in the processes of failing and send a request to perform a restoration of the virtual machine. Other entities may monitor the virtual machines and initiate restorations without departing from the invention.

In Step 702, a high computing resource availability host is identified that does not host the virtual machine in response to the request.

In one or more embodiments of the invention, the high computing resource availability host is a non-production host.

In one or more embodiments of the invention, the high computing resource availability host is a production host that has sufficient resources to perform a restoration. A production host may have sufficient resources if it has a predetermined quantity of available computing resources. The predetermined quantity may be the same quantity that the virtual machine that is to be restored is either currently using or was using before the virtual machine that is to be restored failed.

In Step 704, while the virtual machine is operating, a restoration of the virtual machine is performed in the identified high computing resource availability host is performed.

In one or more embodiments of the invention, performing the restoration includes transferring an image of the virtual machine to the identified high computing resource availability host, transferring a difference disk of the virtual machine to the identified high computing resource availability host, and performing a merge of the virtual machine image and the difference disk.

In one or more embodiments of the invention, performing a merge includes modifying the virtual machine image to reflect the changes included in the difference disk. Once merged, the merged image of the virtual machine may reflect a state of the virtual machine at the time the difference disk was generated, i.e., when changes to the virtual machine were last stored in the difference disk.

In Step 706, the restored virtual machine is migrated.

The restored virtual machine may be migrated to a production host. The production host maybe the host that hosts the existing copy of the virtual machine, or not. The restored virtual machine may be migrated by transferring the merged image of the virtual machine to the production host.

In Step 708, the virtual machine is concealed.

The virtual machine may be concealed by suspending or terminating the execution of the virtual machine, i.e., the existing virtual machine.

In Step 710, the restored virtual machine is exposed.

In one or more embodiments of the invention, the restored virtual machine is exposed by initiating execution of the restored virtual machine.

In one or more embodiments of the invention, the clients that were interacting with the concealed virtual machine may be redirected to the restored virtual machine. In other words, to create a seamless experience of the client, the client interactions with the now concealed virtual machine may be directed to the restored virtual machine. Configurations or other settings from the concealed virtual machine may be transferred to the restored virtual machine to prepare the restored virtual machines to interact with the clients that were interacting with the concealed virtual machines.

The method may end following Step 710.

In one or more embodiments of the invention, a virtual machine is concealed by terminating the virtual machine.

In one or more embodiments of the invention, the high computing resource availability host does not host any exposed virtual machines.

In one or more embodiments of the invention, restoration of a virtual machine includes transferring a backup of the virtual machine from a backup storage to the high computing resource availability host.

In one or more embodiments of the invention, a backup of the virtual machine consists of data associated with a first period of time in the past. In other words, the backup may include a virtual machine image associated with a predetermined period of time and one or more difference disks associated with other finite periods of time.

In one or more embodiments of the invention, performing a restoration of a virtual machine further includes transferring a partial backup of the virtual machine to the high computing resource availability host. The partial backup may be data from a differencing disk. In other words, a partial backup may reflect differential data. In one or more embodiments of the invention, each of the partial backups is generated after an image of the virtual machine is generated.

In one or more embodiments of the invention, performing a restoration of a virtual machine includes merging a full backup and a partial backup on a high computing resource availability host to obtain an up to date backup. The restoration may further include instantiating a restored virtual machine using the up to date backup. Instantiating may cause the restored virtual machine to begin execution. The restored virtual machine may be instantiated by a production agent on a production to which the restored virtual machine has been migrated.

In one or more embodiments of the invention, exposing a restored virtual machine includes sending an execution initiation message to a production agent of the second host. The execution initiation message may specify that the restored virtual machine is to be placed in an executing state.

In one or more embodiments of the invention, migrating the restored virtual machine to a host includes sending a data transfer message to a high computing resource availability host on which the virtual machine was restored. The data transfer message may specify that the restored virtual machine is to be transferred to the second host.

Figure 8A:
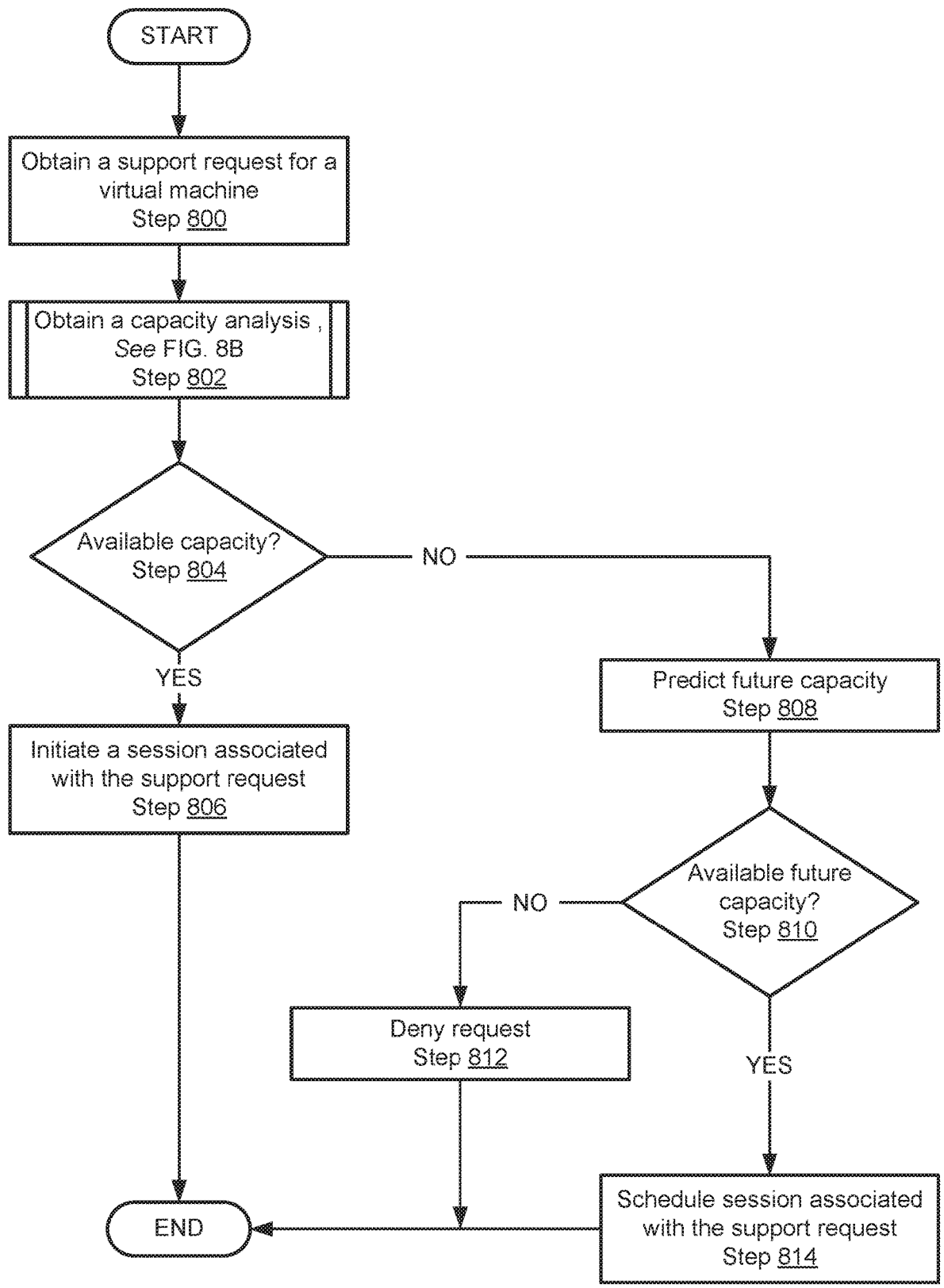
FIG. 8A shows a flowchart of a method of performing a session between a backup agent and a virtual machine in accordance with one or more embodiments of the invention.

As discussed above, remote backup agents may manage the processes of generating backups and restoration, both of which may be computationally expensive operations. FIG. 8A shows a flowchart of a method in accordance with one or more embodiments of the invention. The method depicted in FIG. 8A may be used to service a support request in accordance with one or more embodiments of the invention. The method shown in FIG. 8A may be performed by, for example, remote backup agents (110, FIG. 1). Other components of the system illustrated in FIG. 1 may perform the method of FIG. 8A without departing from the invention.

In Step 800, a support request for a virtual machine is obtained.

In one or more embodiments of the invention, the support request specified an identity of the virtual machine.

In one or more embodiments of the invention, the support request is a backup generation.

In one or more embodiments of the invention, the support request is a restoration of the virtual machine.

In Step 802, a capacity analysis is performed.

In one or more embodiments of the invention, the capacity analysis determines a capacity that a backup storage and/or a remote backup agent have available. The capacity may be, for example, the total number of concurrently performed support sessions associated with performing backups or restorations.

Figure 8B:
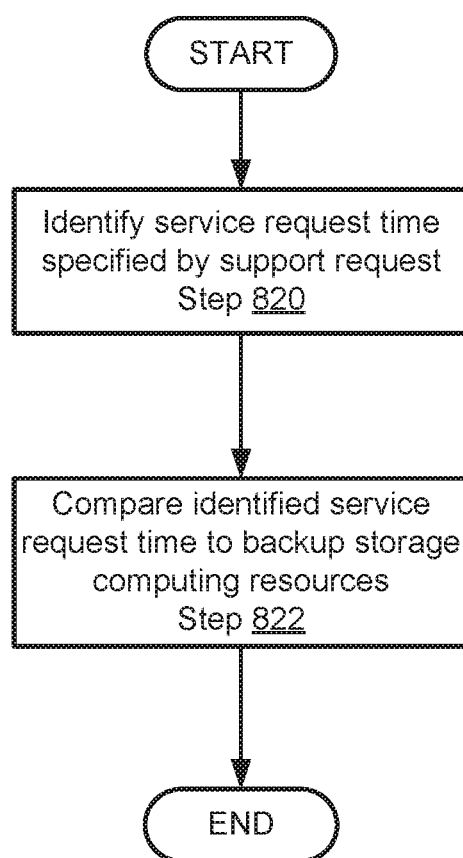
FIG. 8B shows a flowchart of a method of performing a capacity analysis in accordance with one or more embodiments of the invention.

In one or more embodiments of the invention, the capacity analysis is performed via the method illustrated in FIG. 8B. The capacity analysis may be performed via other methods without departing from the invention.

In Step 804, it is determined whether there is available capacity.

In one or more embodiments of the invention, the presence of available capacity is determined based on the capacity analysis. In other words, the capacity analysis may specify whether additional sessions for performing a backup or restoration may be performed without degrading a quality of backup or restoration generation service.

If sufficient capacity is available, the method may proceed to Step 806. If sufficient capacity is not available, the method may proceed to Step 808.

In Step 806, a session associated with the support request is initiated.

In one or more embodiments of the invention, the session is a backup generation session. The backup generation session may generate a backup of the virtual machine of Step 800, or portion thereof.

The method may end following Step 806.

Returning to Step 804, the method may proceed to Step 808 following Step 804. In Step 808, a future capacity is predicted.

In one or more embodiments of the invention, the future capacity is the capacity for performing a backup or restoration in the future. The future capacity may be specified at a granular level, e.g., the number of additional concurrent sessions that may be performed for predetermined time periods in the future.

In one or more embodiments of the invention, the future capacity is predicted by analyzing backup/restoration policies to determine a number of concurrent backup and/or restorations that will be performed in each of the predetermined time periods in the future, identifying a quantity of available computing resources that will be available during each of the predetermined time periods in the future, and predicting the future capacity based on the number of concurrent backup and/or restorations as well as the available computing resources during each of the predetermined periods of time. In one or more embodiments of the invention, the predicted future capacity may specify an available capacity at a granular level over a future period of time, e.g., every 15 minutes for the next 24 hours.

In Step 810, it is determined whether future capacity is available.

In one or more embodiments of the invention, the determination of whether future capacity is available is made by comparing the capacity required for the support request, e.g., a number of concurrent sessions for any number of backups or restorations, to the predicted future capacity. If the required capacity exceeds the predicted future capacity, at any point in time in the future, the future capacity may be determined as being available.

If sufficient capacity is available, the method may proceed to Step 814. If sufficient capacity is not available, the method may proceed to Step 812.

In Step 812, the support request is denied.

The method may end following Step 812.

Returning to Step 810, the method may proceed to Step 814 following Step 810.

In Step 814, a session associated with the support request is scheduled.

In one or more embodiments of the invention, the session is scheduled for a future period of time in which sufficient capacity is available. In other words, the predicted future capacity of Step 808 may be used to determine a period of time in the future in which to schedule a session associated with the support request.

In one or more embodiments of the invention, the scheduled session is a backup session for the virtual machine (e.g., Step 800). In other words, when a support request is for a backup generation the scheduled session may be a backup session.

In one or more embodiments of the invention, the scheduled session is a restoration session for the virtual machine (e.g., Step 800). In other words, when a support request is for a restoration of a virtual machine the scheduled session may be a backup session.

The method may end following Step 814.

FIG. 8B shows a flowchart of a method in accordance with one or more embodiments of the invention. The method depicted in FIG. 8B may be used to service a support request in accordance with one or more embodiments of the invention. The method shown in FIG. 8B may be performed by, for example, remote backup agents (110, FIG. 1). Other components of the system illustrated in FIG. 1 may perform the method of FIG. 8B without departing from the invention.

In Step 820, a service request time specified by a support request is identified.

In one or more embodiments of the invention, the service request time is specified by the support request.

In Step 822, the identified service request time is compared to backup storage computing resources.

In one or more embodiments of the invention, the comparison is based on a bandwidth between the backup storage and a production host that hosts a virtual machine that generated the service request time. The available bandwidth of the backup storage at the identified service request time may be compared to an estimated bandwidth required to complete the support request. Based on the comparison, a number of supportable concurrent sessions at the service request time may be identified.

In one or more embodiments of the invention, the comparison is based on an availability of computation cycles of the backup storage at the identified service request. The available computation cycles may be compared to an estimated number of computation cycles required to complete the support request. Based on the comparison, a number of supportable concurrent sessions at the service request time may be identified.

In one or more embodiments of the invention, the comparison is based on an availability of memory of the backup storage at the identified service request. The available computation cycles may be compared to an estimated quantity of memory cycles required to complete the support request. Based on the comparison, a number of supportable concurrent sessions at the service request time may be identified.

In one or more embodiments of the invention, the comparison is based on an availability of input-output cycles of the storage of the backup storage at the identified service request. The available input-output cycles may be compared to an estimated number of input-output cycles required to complete the support request. Based on the comparison, a number of supportable concurrent sessions at the service request time may be identified.

The method may end following Step 822.

In one or more embodiments of the invention, performing a support session includes storing data of the virtual machine in the backup storages.

In one or more embodiments of the invention, performing a support session includes performing a restoration of the virtual machine using data stored in the backup storages.

In one or more embodiments of the invention, obtaining a capacity analysis of the backup storages includes identifying service request time specified by the support request; and comparing the identified service request time to availability of computing resources of the backup storage. The computing resources of the backup storage may include one or more of an available communication bandwidth between the backup servers and a production host that hosts the virtual machine, an available cache of the backup storage, and an available storage throughput of the backup service (e.g., iops).

In one or more embodiments of the invention, generating a prediction of the future capacity of the backup storages includes identifying a portion of the virtual machines scheduled to have sessions with the backup servers at a prediction time of the future capacity; estimating a workload of each virtual machine of the portion of the virtual machines; aggregating the estimate workloads; and comparing the aggregated workloads to a total computing resources of the backup storages to generate the prediction.

A remote backup agent may be separate from the virtual machines. The virtual machines may be hosted by production hosts separate from the remote backup agent.

In one or more embodiments of the invention, support for a group of virtual machines and/or backups may be requested. In such a scenario, support may be initiated when a group support request for a portion of the virtual machines is obtained. In response to the group support request, a sequential sessions may be initiated with each virtual machine of the portion of the virtual machines. If at least one of the backups for the virtual machines did not complete, a subportion of the portion of the virtual machines for which session were not initiated as part of the sequential session may be identified. The bad host map may be updated to reflect a production host that hosted a virtual machine for which any session of the sequential sessions failed. A second set of sequential sessions may then be initiated with each virtual machine of the subportion of the portion of the virtual machines. In this manner, a failure of generating a backup for any one virtual machine may be overcome and backups for all of the virtual machines, other than the virtual machine that failed, may be generated.

Figure 9:
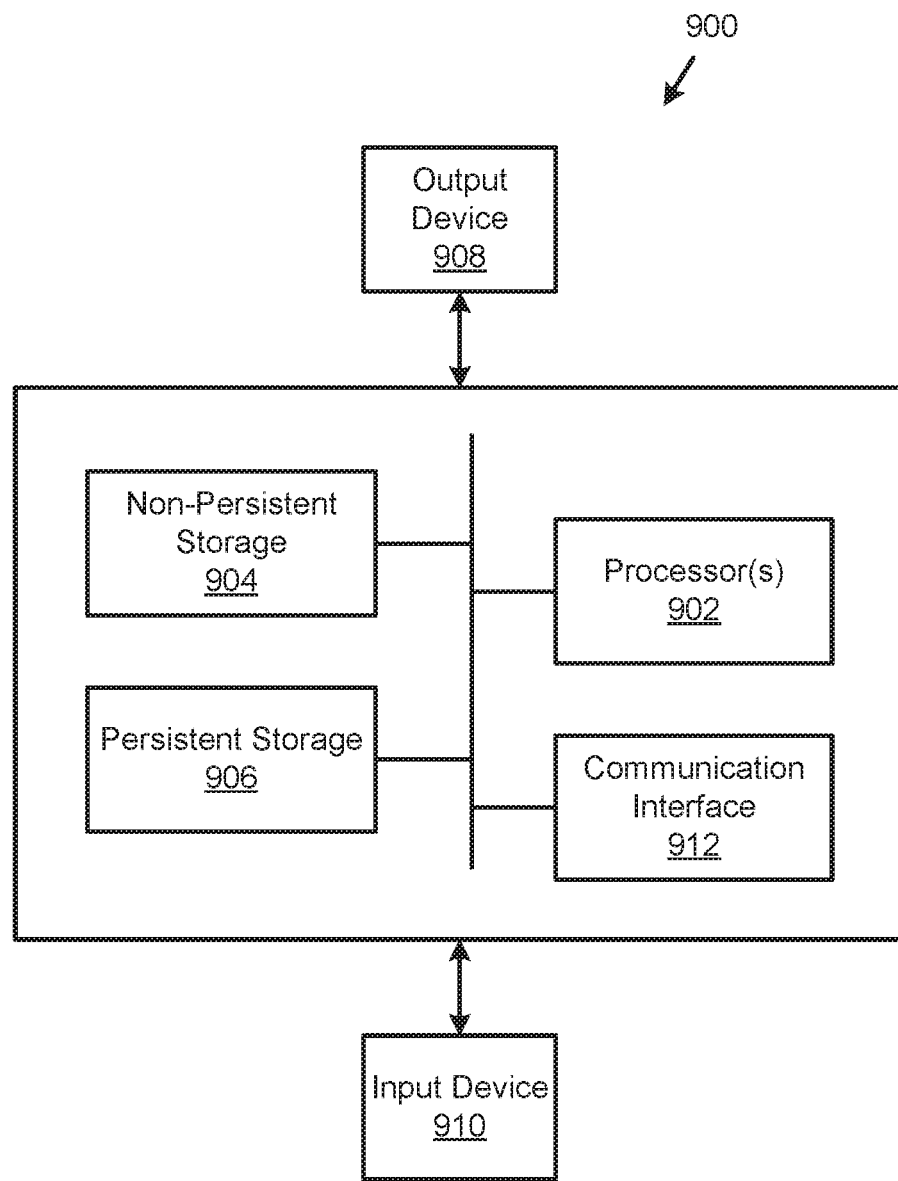
FIG. 9 shows a diagram of a computing device in accordance with one or more embodiments of the invention.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may enable one or more of the following: i) improved user experience by ensuring a minimum quality of service is provided to concurrent sessions and ii) improved store reliability by limiting the number of concurrently performed sessions between a backup storage and a virtual machine.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote backup agent that provides support services to virtual machines using backup storages, comprising:
    a persistent storage comprising a bad host map; and
    a processor programmed to:
        obtain a first support request for a virtual machine of the virtual machines;
        obtain a capacity analysis of the backup storages in response to the request;
        make a first determination, using the capacity analysis, that the backup storages do not have sufficient capacity to service the support request;
        in response to the first determination:
            predict a future capacity of the backup storages;
            make a second determination, using the predicted future capacity, that the backup storages have sufficient capacity to service the support request at a future point in time; and
            in response to the second determination:
                initiate a support session between the remote backup agent and the virtual machine using the bad host map at the future point in time to service the first support request.

2. The remote backup agent of claim 1, wherein the support session comprises:
    storing data of the virtual machine in the backup storages.

3. The remote backup agent of claim 1, wherein the support session comprises:
    performing a restoration of the virtual machine using data stored in the backup storages.

4. The remote backup agent of claim 1, wherein obtaining the capacity analysis of the backup storages comprises:
    identify service request time specified by the support request; and
    comparing the identified service request time to availability of computing resources of the backup storage.

5. The remote backup agent of claim 4, wherein the computing resources of the backup storage comprise:
    an available communication bandwidth between the backup servers and a production host that hosts the virtual machine.

6. The remote backup agent of claim 4, wherein the computing resources of the backup storage comprise:
    an available cache of the backup service.

7. The remote backup agent of claim 4, wherein the computing resources of the backup storage comprise:
    an available storage throughput of the backup service.

8. The remote backup agent of claim 1, wherein the processor is further programmed to:
    obtain a second support request for a virtual machine of the virtual machines;
    make a third determination, using the capacity analysis, that the backup storages do not have sufficient capacity to service the second support request;
    in response to the third determination:
        make a fourth determination, using the predicted future capacity, that the backup storages have do not sufficient capacity to service the support request at a future point in time; and
        in response to the fourth determination:
            deny a second support session between the remote backup agent and the virtual machine to service the second support request.

9. The remote backup agent of claim 1, wherein predicting the future capacity of the backup storages comprises:
    identifying a portion of the virtual machines scheduled to have sessions with the backup servers at a prediction time of the future capacity;
    estimating a workload of each virtual machine of the portion of the virtual machines;
    aggregating the estimate workloads; and
    comparing the aggregated workloads to a total computing resources of the backup storages to generate the prediction.

10. The remote backup agent of claim 1, wherein the remote backup agent is separate from the virtual machines.

11. The remote backup agent of claim 1, wherein the virtual machines are hosted by production hosts separate from the remote backup agent.

12. The remote backup agent of claim 1, wherein the processor is further programmed to:
    obtain a group support request for a portion of the virtual machines;
    in response to the group support request, initiate sequential sessions with each virtual machine of the portion of the virtual machines;
    make a third determination, that the sequential sessions did not complete; and
    in response to the third determination:
        identify a subportion of the portion of the virtual machines for which session were not initiated as part of the sequential session;
        updating the bad host map to reflect a production host that hosted a virtual machine for which any session of the sequential sessions failed; and
        initiate second sequential sessions with each virtual machine of the subportion of the portion of the virtual machines.

13. A method of providing support services to virtual machines, comprising:

obtaining a first support request for a virtual machine of the virtual machines;
obtaining a capacity analysis of the backup storages in response to the request;
making a first determination, using the capacity analysis, that the backup storages do not have sufficient capacity to service the support request;
in response to the first determination:
predicting a future capacity of the backup storages;
making a second determination, using the predicted future capacity, that the backup storages have sufficient capacity to service the support request at a future point in time; and
in response to the second determination:
initiating a support session between the remote backup agent and the virtual machine using the bad host map at the future point in time to service the first support request.

14. The method of claim 13, wherein the support session comprises:
storing data of the virtual machine in the backup storages.

15. The method of claim 13, wherein the support session comprises:
performing a restoration of the virtual machine using data stored in the backup storages.

16. The method of claim 13, wherein obtaining the capacity analysis of the backup storages comprises:
identifying service request time specified by the support request; and
comparing the identified service request time to availability of computing resources of the backup storage.

17. A non-transitory computer readable medium comprising computer readable program code, which when executed by a computer processor enables the computer processor to perform a method for providing support services to virtual machines, the method comprising:
obtaining a first support request for a virtual machine of the virtual machines;
obtaining a capacity analysis of the backup storages in response to the request;
making a first determination, using the capacity analysis, that the backup storages do not have sufficient capacity to service the support request;
in response to the first determination:
predicting a future capacity of the backup storages;
making a second determination, using the predicted future capacity, that the backup storages have sufficient capacity to service the support request at a future point in time; and
in response to the second determination:
initiating a support session between the remote backup agent and the virtual machine using the bad host map at the future point in time to service the first support request.

18. The non-transitory computer readable medium of claim 17, wherein the support session comprises:
storing data of the virtual machine in the backup storages.

19. The non-transitory computer readable medium of claim 17, wherein the support session comprises:
performing a restoration of the virtual machine using data stored in the backup storages.

20. The non-transitory computer readable medium of claim 17, wherein obtaining the capacity analysis of the backup storages comprises:
identifying service request time specified by the support request; and
comparing the identified service request time to availability of computing resources of the backup storage.

* * * * *